United States Patent
Doemens et al.

[11] Patent Number: 5,827,980
[45] Date of Patent: Oct. 27, 1998

[54] FORCE OR EXTENSION SENSOR

[75] Inventors: Günter Doemens, Holzkirchen; Markus Gilch, Mavern, both of Germany

[73] Assignee: Siemens Aktiengesellschaft, Munich, Germany

[21] Appl. No.: 776,956

[22] PCT Filed: Aug. 9, 1995

[86] PCT No.: PCT/DE95/01048

§ 371 Date: Feb. 11, 1997

§ 102(e) Date: Feb. 11, 1997

[87] PCT Pub. No.: WO96/05491

PCT Pub. Date: Feb. 22, 1996

[30] Foreign Application Priority Data

Aug. 16, 1994 [DE] Germany ............... 44 29 049.7

[51] Int. Cl.$^6$ ............................................. G01L 1/12
[52] U.S. Cl. ................................. 73/862.626; 73/862.68
[58] Field of Search ................ 73/862.626, 862.68, 73/780, DIG. 4

[56] References Cited

U.S. PATENT DOCUMENTS

| | | |
|---|---|---|
| 4,204,427 | 5/1980 | Gothe et al. . |
| 4,296,630 | 10/1981 | Jung et al. . |
| 4,386,386 | 5/1983 | Akita ........................ 73/862.626 X |
| 4,566,329 | 1/1986 | Castera et al. ............... 73/862.68 X |
| 4,623,813 | 11/1986 | Naito et al. ................. 73/DIG. 4 X |
| 4,941,363 | 7/1990 | Doemens et al. ............. 73/862.337 |
| 5,233,213 | 8/1993 | Marek ........................ 73/514.02 X |
| 5,511,420 | 4/1996 | Zhao et al. .................. 73/862.626 X |

FOREIGN PATENT DOCUMENTS

| | | |
|---|---|---|
| 0 354 386 | 2/1990 | European Pat. Off. . |
| 21 15 831 | 10/1978 | Germany . |

OTHER PUBLICATIONS

Experimental Mechanics, vol. 15, No. 8, Aug. 1975, Measurement of Static Strain at 2,000° F., by O. Larry Gillette, pp. 316–322.

Primary Examiner—Elizabeth L. Dougherty
Attorney, Agent, or Firm—Hill & Simpson

[57] ABSTRACT

The force or extension sensor has a measuring capacitor (Mk) whose comb-like, interlocking electrode structures (Es1, Es2) can be adjusted in parallel with one another by two attachment points (Bp1, Bp2) as a function of the force (F) or the extension (E) to be measured. The total capacitance of the measuring capacitor (Mk) is determined by a parallel circuit having individual electrode pairs. A change in the total capacitance of the measuring capacitor (Mk) which is brought about by a change in the distances (d1) between the electrodes provides information on the force (F) or the extension ($\epsilon$) to be measured. A change in the distances between the electrodes as a result of temperature-related extension is at least largely avoided by virtue of the fact that the attachment points (Bp1, Bp2) lie on a junction line (V1) which runs parallel to the direction of the electrodes (E1, E2) and is oriented at an angle ($\alpha$) of 40° to 50°, preferably 45°, with respect to the direction of the force (F) or the extension ($\epsilon$) to be measured.

3 Claims, 1 Drawing Sheet

FORCE OR EXTENSION SENSOR

BACKGROUND OF THE INVENTION

European reference EP-B-0 354 386 discloses a measuring pickup for changes in length or distance with mechanical/electrical conversion of measured variables, in which pickup a measuring capacitor with two electrode structures which can be adjusted in parallel with one another is provided as an adjustable capacitor. The comb-like, interlocking electrode structures each comprise a plurality of planar electrodes which are arranged in parallel at a distance from one another and are assigned to one another in pairs. A highly asymmetrical arrangement of the electrode structures permits capacitive isolation to be achieved so that the entire capacitance of the measuring capacitor results from a parallel circuit comprising pairs of electrodes which are each formed by mutually assigned electrodes. The change in capacitance caused by the variable electrode spacing of the pairs of electrodes is used as measured variable. The measuring pickups are used in particular for the contactless measurement of torques on rotating shafts. With electrode structures constructed as microstructures, torsions of several micrometers can be detected, for example. For general measurement of a linear force or extension, the measuring pickups described in European reference EP-B-0 354 386 are suitable only to a limited degree since the temperature-related extension directly changes the distances between the electrodes and thus falsifies the measurement result.

For measuring static or dynamic forces and/or extensions, use is usually made of strain gauges which comprise a plurality of loops of thin resistance wire which are embedded into a carrier made of paper and artificial resin. This carrier is bonded onto the measurement point and, as a result, also experiences the change in length of the measured object. The lengthening or shortening of the wire loops which occurs in this process yields a change in resistance which is proportional to the extension of the measured object. In addition to applications in which the measurement of an extension is the primary purpose of the measurement, a strain gauge can also be used to measure a force by way of the extension. However, limited ability to cope with load changes and overloading, as well as complex application methods, restrict the use of these strain gauges, in particular in terms of use in the field in the construction of plant and machinery.

SUMMARY OF THE INVENTION

The invention is based on the problem of substantially improving the industrial measurement of forces or extension and is to be significantly extended in its range of application in comparison with known strain gauges.

In general terms the present invention is a force or extension sensor with capacitive transducer, having comblike, interlocking electrode structures, which are electrically insulated from one another, in a measuring capacitor. The structures are adjustable in parallel with one another by two attachment points as a function of the force or extension to be measured. The total capacitance of the measuring capacitor is determined by the parallel circuit comprising individual electrode pairs which are each formed by an electrode of one of the electrode structures, and an associated, adjacent electrode of the second electrode structure. The electrode spacing, which can vary in accordance with the force or the extension to be measured, of the electrode pairs is, within the entire measuring range, small in comparison with the distance between adjacent electrodes, which are not associated with one another, of the two electrode structures. The attachment points of the electrode structures lie on a junction line which runs parallel to the direction of the electrodes and which is oriented at an angle of 40° to 50° with respect to the direction of the force or the extension to be measured.

In an advantageous development of the present invention the junction line is oriented at an angle of 45° with respect to the direction of the force or the extension to be measured. Furthermore, at least one electrode of each of the electrode pairs of the measuring capacitor has a smaller thickness in the outer overlapping area.

The force or extension sensor according to the invention has in particular the following advantages over strain gauges:

significantly higher immunity to overloading substantially improved ability to cope with load changes frequency-based measurement signal significantly improved linearity and zero point stability significantly reduced temperature response and hysteresis simple application, largely independent of the coefficient of thermal expansion of the carrier material cost-effective design by virtue of microsystem technology.

Owing to the above advantages, the force or extension sensor according to the invention will supersede the known strain gauges in a large number of areas, and open up new applications, for example in plant engineering and automotive technology.

The invention is based on the recognition that a temperature-related extension of the distances between the electrodes is at least largely prevented if the position of the attachment points of the electrode structures lies on a junction line which runs parallel to the direction of the electrodes and if this junction line is oriented at an angle of 40 to 50° with respect to the direction of the force or the extension to be measured. If the junction line is oriented at an angle of approximately 45° with respect to the direction of the force or the extension to be measured, the electrode spacing is not fundamentally affected, as the actual measured variable, by the temperature. In this arrangement, the temperature-related extension changes only to an extremely small degree the capacitance of the measuring capacitor by way of the change in area. However, this influence by way of the change in area can be virtually completely avoided by means of the electrode shape

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
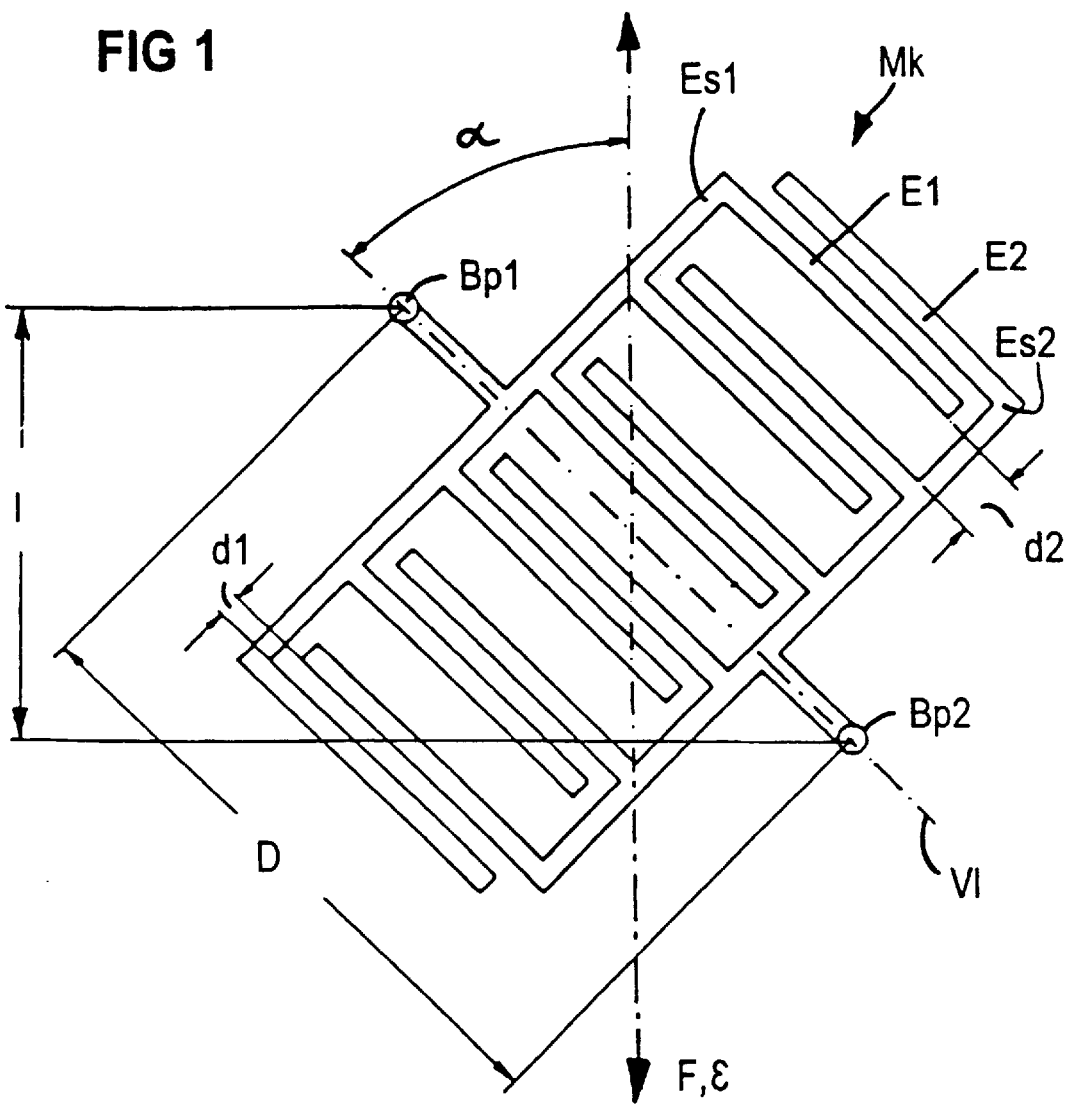
FIG. 1 shows a force or extension sensor with a capacitive transducer formed by means of a measuring capacitor.

FIG. 1 shows, in a highly simplified schematic view, a force or extension sensor with a capacitive transducer which is formed by a measuring capacitor Mk. The measuring capacitor Mk is formed by two comb-like electrode structures Es1 and Es2 whose electrodes E1 and E2 are arranged in such a way that in each case a small electrode spacing d1 is followed by a substantially larger electrode spacing d2. Accordingly, capacitances formed over electrode pairs with the distance d2 are negligibly small in comparison with the capacitances formed over the distances d1 of the electrode pairs. The total capacitance of the measuring capacitor Mk is thus yielded by the parallel circuit comprising the electrode pairs with the electrode spacing d1.

The two comb-like, interlocking electrode structures Es1 and Es2 can be adjusted in parallel with one another by means of two attachment points Bp1 and Bp2, connected to the crosspiece of the comb, as a function of the force F or the extension $\epsilon$ to be measured. The attachment points Bp1 and Bp2 are connected, for example, in an electrically insulated fashion to a carrier which is not illustrated in more detail in the drawing and which is itself attached to the measured object (likewise not illustrated) using screws, for example. It is likewise possible to provide the attachment points Bp1 and Bp2 directly on the measured object. The electrically insulated attachment is effected for example using ceramic platelets which are metallized on both sides and are connected to the attachment points Bp1 and Bp2 and to the carrier by soldering.

The two attachment points Bp1 and Bp2 lie on a junction line V1 which runs parallel to the direction of the electrodes E1 and E2 and which is itself oriented at an angle $\alpha$ with respect to the force F or the extension $\epsilon$ to be measured.

If then the distance between the attachment points Bp1 and Bp2 on the junction line V1 is designated by D and the distance between the attachment points Bp1 and Bp2 determined in the direction of the force F or the extension $\epsilon$ to be measured is designated by 1, the following relation applies $$1 = D \cdot \cos\alpha$$

If the distance 1 changes by the amount $\Delta 1$ as a result of the force F, $\epsilon = \Delta 1/1$ applies to the extension. The change in length $\Delta 1$ brings about, on the other hand, a change in the electrode spacing d1 of $$\Delta d1 = \Delta 1 \cdot \sin\alpha$$

Thus, the following relation applies to the change $\Delta d1$ of the electrode spacing d1

$$\Delta d1 = 1/2 \epsilon \cdot D \cdot \sin 2\alpha$$

A maximum value of the change in the electrode spacing d1 brought about by the force F then occurs at an angle $\alpha = 45°$ as $$\Delta 1_{max} = 1/2 \epsilon \cdot D$$

The change $\Delta d1$, described above, in the electrode spacing d1 causes a change in the total capacitance of the measuring capacitor Mk, this change in capacitance being a measure of the force or the extension $\epsilon$ to be measured.

With regard to falsification of the measurement result by temperature influences, it is readily apparent that temperature-related extensions do not, as a matter of principle, influence the electrode spacing d1 as measured variable at an angle $\alpha = 45°$. The temperature-related extension influences only to an extremely small degree the capacitance of the measuring capacitor Mk by way of a change in area of the electrode pairs.

Figure 2:
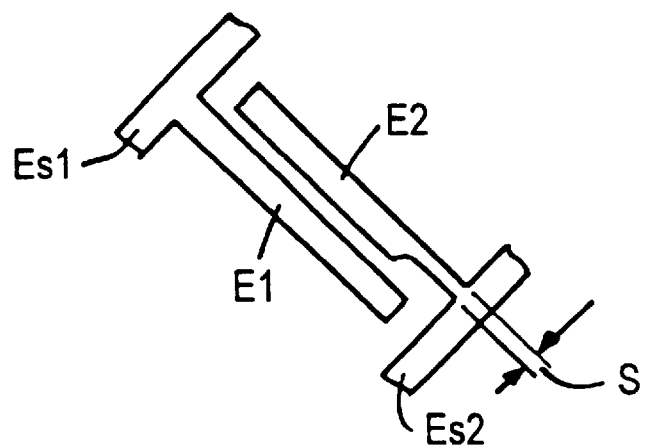
FIG. 2 shows a specific electrode shape of the measuring capacitor.

Influence of the temperature-related change in area on the capacitance of the measuring capacitor Mk can be virtually completely avoided by means of the electrode shape illustrated in FIG. 2. With this specific electrode shape, in each case one electrode E2 of an electrode pair E1, E2 has a smaller thickness S in the outer overlapping area than in the rest of the capacitive, effective area. Temperature-related changes in area then only affect the overlapping area with the reduced thickness S, which area has virtually no influence any more on the capacitance of the measuring compensator Mk as a result of the distance between the electrode pairs E1, E2 which is correspondingly increased here.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A force or extension sensor with capacitive transducer, comprising:

a measuring capacitor having comb-like, interlocking electrode structures, which are electrically insulated from one another, the structures being adjustable in parallel with one another by two attachment points thereof as a function of a force or extension to be measured;

a total capacitance of the measuring capacitor being determinable by a parallel circuit having individual electrode pairs each of which being formed by a first electrode of a first electrode structure of the electrode structures, and an associated, adjacent second electrode of a second electrode structure of the electrode structures;

an electrode spacing, which can vary in accordance with the force or the extension to be measured, of the electrode pairs is, within an entire measuring range, small in comparison with a distance between the adjacent first and second electrodes, which are not associated with one another, of the first and second electrode structures;

the attachment points of the first and second electrode structures lie on a junction line which runs parallel to a direction of the first and second electrodes and which is oriented at an angle in the range of 40° to 50° with respect to the direction of the force or the extension to be measured.

2. The force or extension sensor as claimed in claim 1, wherein the junction line is oriented at an angle of 45° with respect to the direction of the force or the extension to be measured.

3. The force or extension sensor as claimed in claim 1, wherein at least one electrode of each of the electrode pairs of the measuring capacitor has a smaller thickness in an outer overlapping area.

* * * * *